(12) United States Patent
Renfer et al.

(10) Patent No.: US 6,291,125 B1
(45) Date of Patent: Sep. 18, 2001

(54) TERPOLYMER IMAGING MEMBER AND IMAGING PROCESS

(75) Inventors: Dale S. Renfer; John F. Yanus, both of Webster; William W. Limburg, Penfield; Damodar M. Pai, Fairport; Paul J. DeFeo, Sodus Point; Richard L. Schank, Pittsford, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/431,109

(22) Filed: Nov. 1, 1999

(51) Int. Cl.[7] .................... G03G 13/06; G03G 5/047; G03G 64/12; G03G 64/24
(52) U.S. Cl. ................... 430/120; 430/56; 430/58.7; 430/66; 430/96; 430/117; 528/196; 528/201; 528/203; 528/204
(58) Field of Search ................ 430/56, 58.7, 66, 430/96, 73, 117, 120; 528/203, 196, 201, 204

(56) References Cited

U.S. PATENT DOCUMENTS

| | | | |
|---|---|---|---|
| 4,806,443 | 2/1989 | Yanus et al. | 430/56 |
| 5,028,687 | 7/1991 | Yanus et al. | 528/203 |
| 5,283,143 | * 2/1994 | Yanus et al. | 430/58.7 |
| 5,368,967 | 11/1994 | Schank et al. | 430/66 |

* cited by examiner

Primary Examiner—Janis L. Dote
(74) Attorney, Agent, or Firm—Oliff & Berridge, PLC

(57) ABSTRACT

A terpolymer represented by formula

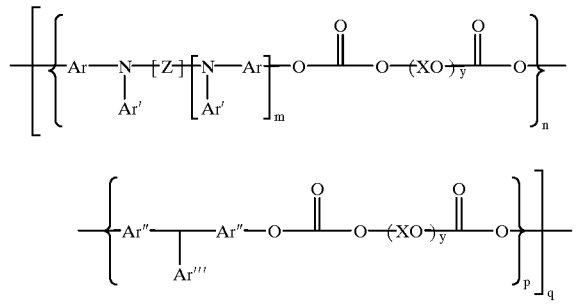

is useful in particular in electrophotographic imaging members.

14 Claims, No Drawings

TERPOLYMER IMAGING MEMBER AND IMAGING PROCESS

BACKGROUND OF THE INVENTION

This invention relates in general to a terpolymer, an imaging member and imaging process and, more specifically, to aryl amine terpolymers and electrophotographic imaging members and processes utilizing such aryl amine terpolymers.

In the art of electrophotography an electrophotographic plate comprising a photoconductive insulating layer on a conductive layer is imaged by first uniformly electrostatically charging the surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles on the surface of the photoconductive insulating layer. The resulting visible toner image can be transferred to a suitable receiving member such as paper. This imaging process may be repeated many times with reusable photoconductive insulating layers.

As more advanced, higher speed electrophotographic copiers, duplicators and printers were developed, degradation of image quality was encountered during cycling. Moreover, complex, highly sophisticated, duplicating and printing systems operating at high speeds have placed stringent requirements including narrow operating limits on photoreceptors. For example, the numerous layers found in many modern photoconductive imaging members must be highly flexible, adhere well to adjacent layers, and exhibit predictable electrical characteristics within narrow operating limits to provide excellent toner images over many thousands of cycles. There is also a great current need for long service life, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, e.g. less than about 0.75 inch (19 mm) diameter, raise the threshold of mechanical performance criteria for photoreceptors to such a high level that spontaneous photoreceptor belt material failure becomes a frequent event for flexible belt photoreceptors.

One type of multilayered photoreceptor that has been employed as a belt in electrophotographic imaging systems comprises a substrate, a conductive layer, a charge blocking layer a charge generating layer, and a charge transport layer. The charge transport layer often comprises an activating small molecule dispersed or dissolved in a polymeric film forming binder. Generally, the polymeric film forming binder in the transport layer is electrically inactive by itself and becomes electrically active when it contains the activating molecule. The expression "electrically active" means that the material is capable of supporting the injection of photogenerated charge carriers from the material in the charge generating layer and is capable of allowing the transport of these charge carriers through the electrically active layer in order to discharge a surface charge on the active layer. The multilayered type of photoreceptor may also comprise additional layers such as an anti-curl backing layer, an adhesive layer, and an overcoating layer. Although excellent toner images may be obtained with multilayered belt photoreceptors that are developed with dry developer powder (toner), it has been found that these same photoreceptors become unstable when employed with liquid development systems. Thence photoreceptors suffer from cracking, crazing, crystallization of active compounds, phase separation of activating compounds and extraction of activating compounds caused by contact with the organic carrier fluid, isoparaffinic hydrocarbons e.g. Isopar, commonly employed in liquid developer inks which, in turn, markedly degrade the mechanical integrity and electrical properties of the photoreceptor. More specifically, the organic carrier fluid of a liquid developer tends to leach out activating small molecules, such as the arylamine containing compounds typically used in the charge transport layers. Representative of this class of materials are: N,N'-diphenyl-N,N'-bis(3-methylphenyl)-[1,1'-biphenyl]-4,4'-diamine; bis-(4-diethylamino-2-methylphenyl)-phenylmethane; 2,5-bis-(4'-dimethylaminophenyl)-1,3,4,-oxadiazole; 1-phenyl-3-(4'-diethylaminostyryl)-5-( 4"-diethylaminophenyl)-pyrazoline; 1,1-bis-(4-(di-N,N'-p-methylphenyl)-aminophenyl)-cyclohexane; 4-diethylaminobenzaldehyde-1,1-diphenylhydrazone; 1,1-diphenyl-2(p-N,N-diphenyl amino phenyl)-ethylene; N-ethylcarbazole-3-carboxaldehyde-1-methyl-1-phenylhydrazone. The leaching process results in crystallization of the activating small molecules, such as the aforementioned arylamine compounds, onto the photoreceptor surface and subsequent migration of arylamines into the liquid developer ink. In addition, the ink vehicle, typically a $C_{10}$–$C_{14}$ branched hydrocarbon, induces the formation of cracks and crazes in the photoreceptor surface. These effects lead to copy defects and shortened photoreceptor life. The degradation of the photoreceptor manifests itself as increased background and other printing defects prior to complete physical photoreceptor failure.

The leaching out of the activating small molecule also increases the susceptibility of the transport layer to solvent/stress cracking when the belt is parked over a belt support roller during periods of non-use. Some carrier fluids also promote phase separation of the activating small molecules, such as arylamine compounds and their aforementioned derivatives, in the transport layers, particuiarly when high concentrations of the arylamine compounds are present in the transport layer binder. Phase separation of activating small molecules also adversely alters the electrical and mechanical properties of a photoreceptor. Although flexing is normally not encountered with rigid, cylindrical, multi-layered photoreceptors which utilize charge transport layers containing activating small molecules dispersed or dissolved in a polymeric film forming binder, electrical degradation are similarly encountered during development with liquid developers. Sufficient degradation of these photoreceptors by liquid developers can occur in less than eight hours of use thereby rendering the photoreceptor unsuitable for even low quality xerographic imaging purposes. Thus, in advanced imaging systems utilizing multilayered belt photoreceptors exposed to liquid development systems, cracking and crazing have been encountered in critical charge transport layers during belt cycling. Cracks developing in charge transport layers during cycling can be manifested as print-out defects adversely affecting copy quality. Furthermore, cracks in the photoreceptor pick up toner particles which cannot be removed in the cleaning step and may be transferred to the background in subsequent prints. In addition, crack areas are subject to delamination when contacted with blade cleaning devices thus limiting the options in electrophotographic product design.

Photoreceptors having charge transport layers containing small molecule arylaminia compounds dispersed or dissolved in various resins such as polycarbonates are known in the art. Similarly, photoreceptors utilizing polymeric arylamine containing molecules such as polyvinyl carbazole, polymethacrylates possessing pendant arylamines are also known. Further, condensation polymers of a di-secondary amine with a di-iodo aryl compound are described in the prior art.

Modern multilayered organic photoreceptors of the prior art possess a hole transporting top layer comprising a low ionization potential (Ip) material. Although a low ionization potential is an essential feature for hole transport, that property also makes the hole transporting layer sensitive to attack by powerful oxidizing agents which are generated by the corona. Prolonged cycling runs, as well as exposure to absorbed oxidants outgassing from corotrons, causes an increase in surface conductivity which results in fine line resolution loss and blurred images.

One material which is particularly sensitive to corona induced deletion is a hole transporting polymer condensation product of N,N'-diphenyl-N,N'-bis(3-hydroxyphenyl)-[1,1'-biphenyl]-4,4'-diamine and diethylene glycol bischloroformate. This polymer is described in detail in U.S. Pat. No. 4,806,443 and U.S. Pat. No. 5,028,687, the entire disclosures of these patents being incorporated herein by reference. Although this polymer possesses many admirable features, the corona sensitivity render it undesirable for use in machines not possessing adequate air flow surface cleaning and which uses multiple charging devices that out gas corona generated species during off time.

INFORMATION DISCLOSURE STATEMENT

U.S. Pat. No. 4,806,443 issued to J. Yanus et al. on Feb. 21, 1989—An electrostatographic imaging member and an electrophotographic imaging process are disclosed for using the imaging member are disclosed in which the imaging member comprises a substrate and an electroconductive layer, the imaging member comprising a polymeric acrylamine compound represented by a specific formula. The imaging member may comprise a substrate, charge generation layer and a charge transport layer.

U.S. Pat. No. 5,028,687 issued to J. Yanus et al. on Jul. 2, 1991—An arylamine polymer is disclosed composed of recurring units represented by a specific formula. This polymer may be used in an electrophotographic imaging member.

U.S. Pat. No. 5,368,967 issued to R. Schank et al. on Nov. 29, 1994—An electrophotographic imaging member is disclosed comprising a substrate, a charge generating layer, a charge transport layer, and an overcoat layer comprising a small molecule hole transporting arylamine having at least two hydroxy functional groups, a hydroxy or multihydroxy triphenyl methane and a polyamide film forming binder capable of forming hydrogen bonds with the hydroxy functional groups the hydroxy arylamine ard hydroxy or multihydroxy triphenyl methane. This overcoat layer may be fabricated using an alcohol solvent. This electrophotographic imaging member may be utilized in an electrophotographic imaging process.

BRIEF SUMMARY OF THE INVENTION

It is, therefore, an object of the present invention to provide an improved polymer, imaging member and imaging process.

It is another object of the present invention to provide an improved polymer, imaging member and imaging process which suppress corona induced deletion.

It is still another object of the present invention to provide an improved terpolymer, imaging member and imaging process which resists adverse effects from contact with liquid ink developers.

It is yet another object of the present invention to provide an improved terpolymer, imaging member and imaging process which possesses excellent abrasion resistance.

It is another object of the present invention to provide an improved terpolymer, imaging member and imaging process which is extremely flexible.

The foregoing objects and others are accomplished in accordance with this invention by providing a terpolymer represented by the formula

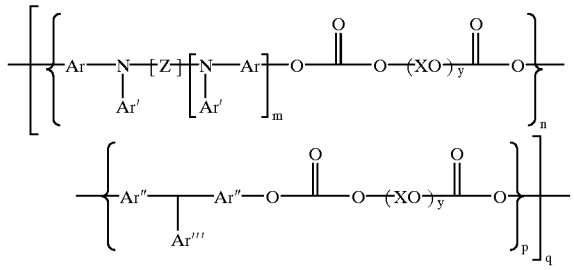

wherein $n+p=1$ and values of p range from 0.05 to 0.40, q is between about 5 and about 1000, m is 0 or 1, y is 1, 2 or 3, Z is selected from the group consisting of:

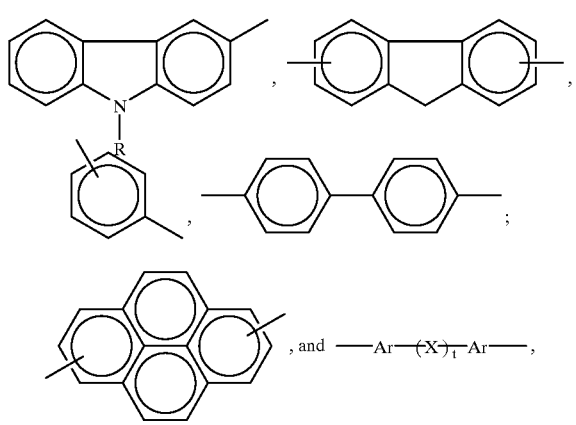

wherein t is 1, 2 or 3

Ar is selected from the group consisting of:

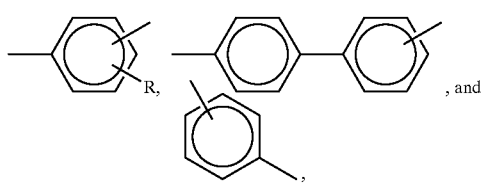

R is selected from the group consisting of alkyl and isoalkyl groups containing 2 to 10 carbon atoms, such as an alkyl containing 2 to 4 carbon atoms, Ar' is selected from the group consisting of:

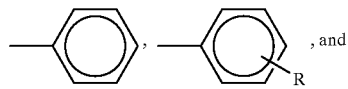

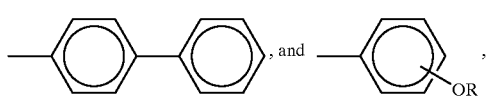

Ar" is selected from the group consisting of:

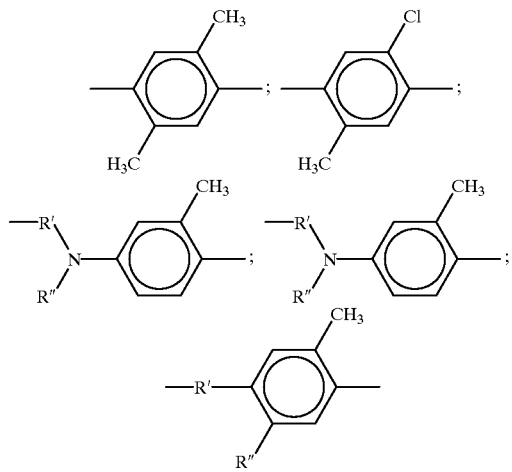

R' is selected from the group consisting of: —CH₂—, —CH₂CH₂—, and —CH₂CH₂CH₂—, and Ar'" is selected from the group consisting of:

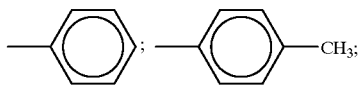

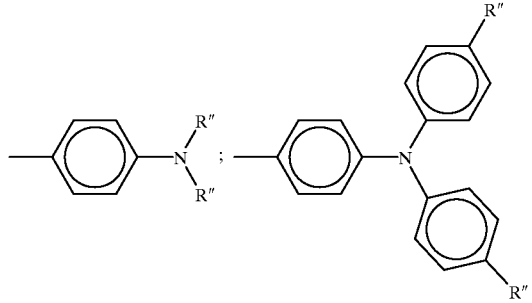

R" is selected from the group consisting of: —CH₃ and —C₂H₅,

X is selected from the group consisting of:

$$-CH_2-, \quad -CH_2CH_2-, \quad -C(CH_3)_2-, \quad -O-,$$

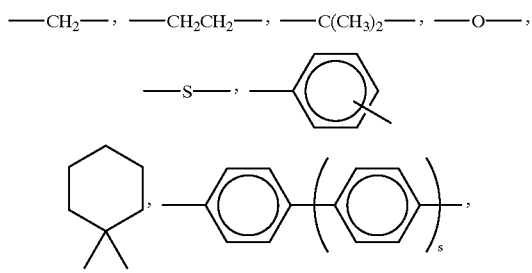

and >N—R, and s is 0, 1 or 2.

A preferred composition can be represented by the following structural formula:

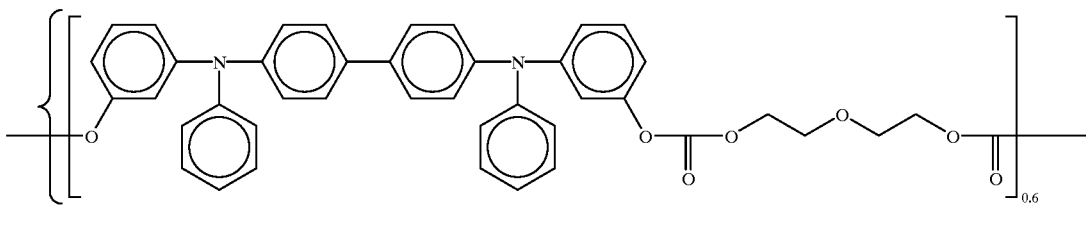

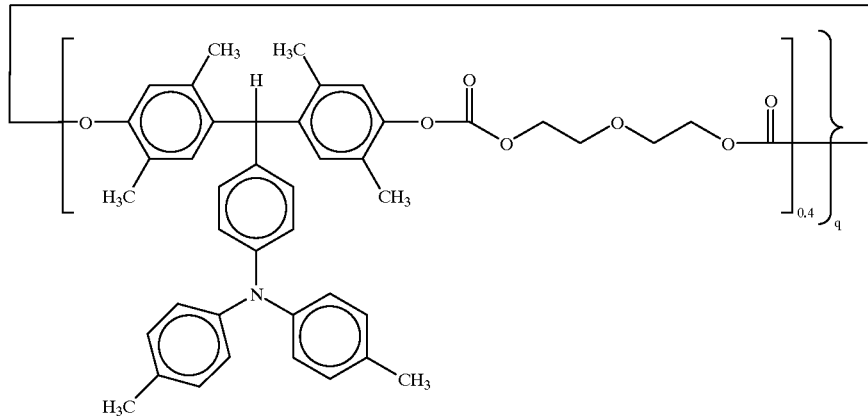

wherein q is defined as above.

This terpolymer may be used as the outer layer of an electrophotographic imaging member. The electrophotographic imaging member of this invention may be employed in any suitable electrophotographic imaging process.

Generally, terpolymers of this invention may be prepared by reacting a dihydroxy arylamine compound represented by the formula:

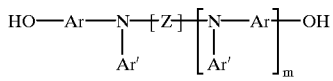

wherein m, Ar, Ar' and Z are as defined above and a second co-reactant dihydroxy functionalized triarylmethane compound represented by the formula:

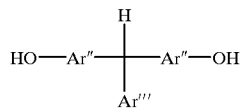

wherein Ar" and Ar''' are as defined above, and
a co-reactant glycol bis-chloroformate compound represented by the formula:

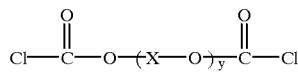

wherein:
y and X are as defined above and

Compounds represented by the above hydroxy arylamine formula may be prepared by hydrolyzing an alkoxy arylamine. A typical process for preparing alkoxy arylamines is disclosed in Example 1 of U.S. Pat. No. 4,588,666 to Stolka et al, the entire disclosure of this patent being incorporated herein by reference. Typical compounds represented by the above formula for hydroxy arylamine compounds include:

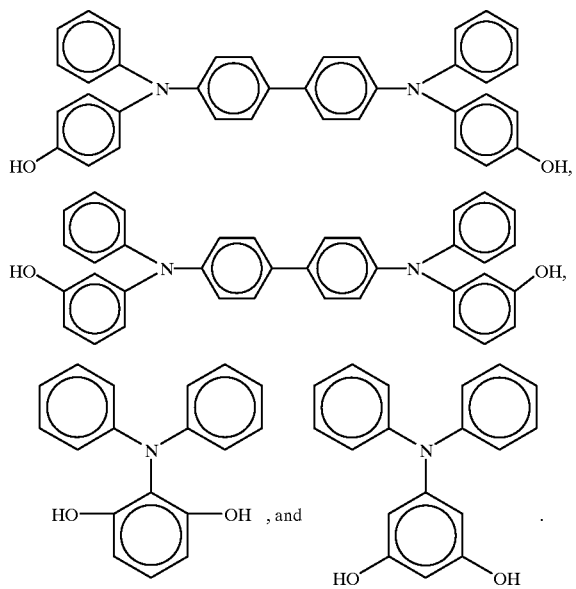

Typical compounds represented by the dihydroxy triarylmethane compound can be prepared in a manner similar to that disclosed in U.S. Pat. No. 3,820,989, the entire disclosure thereof being incorporated herein by reference. Typical compounds represented by the above formula for dihydroxytriarylmethane compounds include:

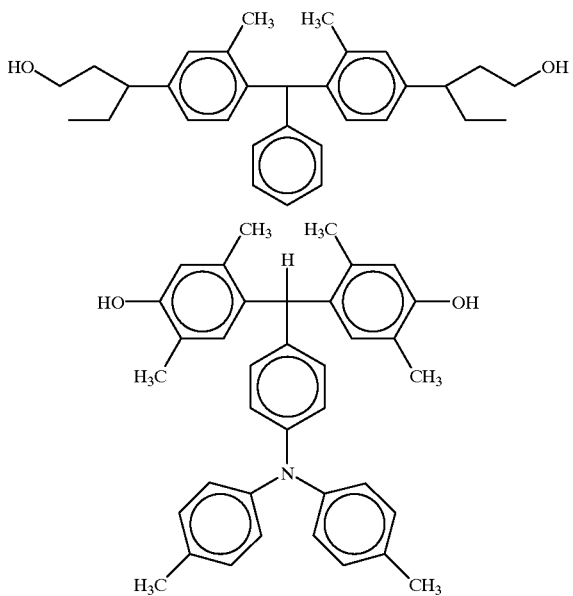

Typical compounds represented by the above formula for the glycol chloroformate compound include:

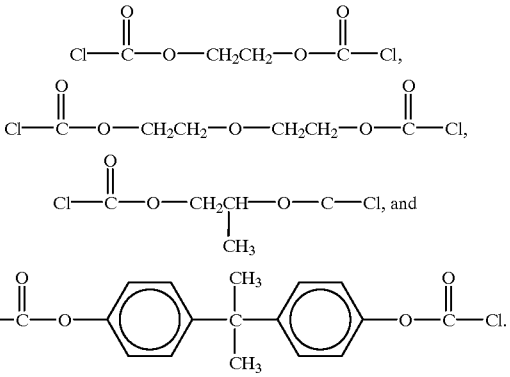

Any suitable solvent may be employed to dissolve the reactants. Typical solvents include tetrahydrofuran, methylene chloride, and the like. Satisfactory yields are achieved with reaction temperatures between about −20° C. and about 60° C. The reaction temperature selected depends to some extent on the specific reactants utilized and is limited by the temperature sensitivity of the dihydroxy arylamine. The reaction temperature may be maintained by any suitable technique such as heating mantles, radiant heat lamps, oil baths, and the like.

The reaction time depends upon the reaction temperatures and reactants used. Thus, less reaction time is required when higher reaction temperatures are employed. Generally, increasing the reaction time increases the degree of polymerization. Satisfactory results have been achieved with reaction times between about 20 minutes to about 60 minutes at elevated temperatures. For practical purposes, sufficient degree of polymerization is achieved by the time the reaction product layer is viscous.

One may readily determine whether sufficient reaction product has been formed by monitoring the increase in solution viscosity. Typical arylamine coreactants for synthesizing the terpolymers of this invention include, for example, those disclosed in U.S. Pat. No. 5,028,687, the entire disclosure thereof being incorporated herein by reference.

The terpolymer is formed from the above coreactants by placing in an appropriately sized reaction flask equipped with a mechanical stirrer, argon blanket, pressure equalized addition funnel, and cooling bath, $H_2O$, KOH, benzyltriethylammonium chloride, a bishydroxytriarylmethane compound, a dihydroxy aryl amine compound, and tetrahydrofuran. This reaction mixture is cooled using an ice bath while being stirred. A 3.5 volume percent solution of the bis choroformate, the molar amount equal to the combined number of moles of the two bis hydroxy containing compounds in the reaction, in dichloromethane is prepared. This solution is placed in the pressure equalized addition funnel. The reaction mixture is stirred rapidly (about 700 rpm) and the dichloromethane bis-chloroformate solution is added over a period of one hour. A this point, the ice bath is replaced by a warm or hot water bath, depending on the final reaction temperature desired, which is usually not over 60° C. The reaction is continued for about 1.5 hours. The reaction is extracted several times with water. The dichloromethane solution is added to methanol in a blender. The polymer drops out of solution and is collected by filtration.

A photoconductive imaging member of this invention may be prepared by providing a substrate having an electrically conductive surface, applying a charge blocking layer on the electrically conductive surface, applying a charge generation layer on the blocking layer, applying a charge transport layer on the charge generation layer, and applying an overcoating layer on the charge transport layer. The terpolymer of this invention is present as the outer layer which can be a charge transport layer or, if present, as an overcoating layer.

The substrate of the photoreceptor may be opaque or substantially transparent and may comprise numerous suitable materials having the required mechanical properties. Accordingly, the substrate may comprise a layer of an electrically non-conductive or conductive material such as an inorganic or an organic composition. As electrically non-conductive materials there may be employed various resins known for this purpose including polyesters, polycarbonates, polyamides, polyurethanes, and the like. The electrically insulating or conductive substrate may be rigid or flexible and may have any number of different configurations such as, for example, a cylinder, sheet, a scroll, an endless flexible belt, and the like. Preferably, the substrate is in the form of an endless flexible belt and comprises a commercially available biaxially oriented polyester known as MYLAR™, available from E. I. Du Pont de Nemours & Co., or MELINEX™ available from ICI.

The thickness of the substrate layer depends on numerous factors, including economical considerations, and thus a layer for a flexible belt may be of substantial thickness, forexample, over 200 micrometers, or of minimum thickness less thanz 50 micrometers, provided there are no adverse affects on the final photoconductive device. In one flexible belt embodiment, the thickness of this layer ranges from about 65 micrometers to about 150 micrometers, and preferably from about 75 micrometers to about 125 micrometers for optimum flexibility and minimum stretch when cycled around small diameter rollers, e.g. 12 millimeter diameter rollers. The surface of the substrate layer is preferably cleaned prior to coating to promote greater adhesion of the deposited coating. Cleaning may be effected by exposing the surface of the substrate layer to plasma discharge, ion bombardment and the like.

The conductive layer may vary in thickness over substantially wide ranges depending on the optical transparency and flexibility desired for the electrophotoconductive member. Accordingly, when a flexible photoresponsive imaging device is desired, the thickness of the conductive layer may be between about 20 angstrom units to about 750 angstrom units, and more preferably from about 50 Angstrom units to about 200 angstrom units for an optimum combination of electrical conductivity, flexibility and light transmission. The conductive layer may be an electrically conductivey metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. If desired, an alloy of suitable metals may be deposited. Typical metal alloys may contain two or more metals such as zirconium, niobium, tantalum, vanadium and hafnium, titanium, nickel, stainless steel, chromium, tungsten, molybdenum, and the like, and mixtures thereof. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a conductive carbon black dispersed in a plastic binder as an opaque conductive layer.

After deposition of the metal layer, a hole blocking layer may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be organic or inorganic and may be deposited by any suitable technique. For example, if the blocking layer is soluble in a solvent, it may be applied as a solution and the solvent can subsequently be removed by any conventional method such as by drying. Typical blocking layers include polyvinylbutyral, organosilanes, epoxy resins, polyesters, polyamides, polyurethanes, pyroxyline vinylidene chloride resin, silicone resins, fluorocarbon resins and the like containing an organo metallic salt. Other blocking layer materials include nitrogen containing siloxanes or nitrogen containing titanium compounds such as trimethoxysilyl propylene diamine, hydrolyzed trimethoxysilyl propyl ethylene diamine; N-beta-(aminoethyl) gamma-amino-propyl trimethoxy silanea, isopropyl 4-aminobenzene sulfonyl, di(dodecylbenzene sulfonyl) titanate, isopropyl di(4-aminobenzoyl) isostearoyl titanate, isopropyl tri(N-ethylamino-ethylamino) titanate, isopropyl trianthranil titanate, isopropyl tri(N,N-dimethylethylamino) titanate, titanium-4-amino benzene sulfonat oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. No. 4,291,110, U.S. Pat. No. 4,338,387, U.S. Pat. No. 4,286,033 and U.S. Pat. No. 4,291,110, the entire disclosures of these patents being incorporated herein in their entirety. A preferred blocking layer comprises a reaction product between a hydrolyzed silane and the oxidized surface of a metal ground plane layer. The oxidized surface inherently forms on the outer surface of most metal ground plane layers when exposed to air after deposition.

The blocking layer should be continuous and have a thickness of less than about 0.5 micrometer because greater thickness may lead to undesirably high residual voltage. A blocking layer of between about 0.005 micrometer and about 0.3 micrometer (50 Angstroms-3000 Angstroms) is preferred because charge neutralization after the exposure step is facilitated and optimum electrical performance is achieved. A thickness of between about 0.03 micrometer and about 0.06 micrometer is preferred for metal oxide layers for optimum electrical behavior. Optimum results are achieved with a siloxane blocking layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. Generally, a weight ratio of blocking layer material and solvent of between about 0.05:100 and about 0.5:100 is satisfactory for spray coating. This siloxane coating is described in U.S. Pat. No. 4,464,450, the disclosure of this patent being incorporated herein in its entirety.

If desired, any suitable adhesive layer may be applied to the hole blocking layer. Typical adhesive layers include a polyester resin such as VITEL™ PE-100, VITEL™ PE-200, VITEL™ PE-200D, and VITEL™ PE-222, all available from Goodyear Tire and Rubber Co., polyvinyl butyral, DUPONT 49,000 polyester, and the like. When an adhesive layer is employed, it should be continuous and preferably, has a dry thickness between about 200 micrometers and about 900 micrometers and more preferably between about 400 micrometers and about 700 micrometers. Any suitable solvent or solvent mixtures may be employed to form a coating solution of the adhesive layer material. Typical solvents include tetrahydrofuran, toluene, methylene chloride, cyclohexanone, and the like, and mixtures thereof. Generally, to achieve a continuous adhesive layer thickness of about 900 angstroms or less by gravure coating techniques, the solids concentration are between about 2 percent and about 5 percent by weight based on the total weight of the coating mixture of resin and solvent. However, any other suitable and conventional technique may be utilized to mix and thereafter apply the adhesive layer coating mixture to the charge blocking layer. Typical application techniques include spraying, dip coating, roll coating, wire wound rod coating, and the like. Drying of the deposited coating may be effected by any suitable conventional technique such as oven drying, infra red radiation drying, air drying and the like.

At least one electrophotoconductive layer is applied next. The at least one electrophotoconductive layer may be a single layer comprising, for example photoconductive particles dispersed in a film forming binder or multiple layers, for example, a charge generator layer (photogenerating layer) and a charge transport layer. Generally, these photoconductive layers are well known in the art. If only a single electrophotoconductive layer is employed, the film forming binder for the photoconductive particles comprises the terpolymer of this invention.

Any suitable photogenerating layer may be applied to the blocking layer or intermediate layer if one is employed, which can then be overcoated with a contiguous hole transport layer as desired. Examples of photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, quinacridones available from DuPont under the tradename MONASTRAL RED™, MONASTRAL VIOLET™ and MONASTRAL RED Y™, VAT ORANGE 1™ and VAT ORANGE 3™ trade names for dibromoanthanthrone pigments, benzimidazole perylene, substituted 2,4-diamino-triazines described in U.S. Pat. No. 3,442,781, polynuclear aromatic quinones available from Allied Chemical Corporation under the tradename INDOFAST DOUBLE SCARLE™, INDOFAST VIOLET LAKE B™, INDOFAST BRILLIANT SCARLET™ and INDOFAST ORANGE™, and the like dispersed in a film forming polymeric binder. Selenium, selenium alloy, benzimidazole perylene, and the like and mixtures thereof may be formed as a continuous, homogeneous photogenerating layer. Benzimidazole perylene compositions are well known and described, for example in U.S. Pat. No. 4,587,189, the entire disclosure thereof being incorporated herein by reference. Multiphotogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layer comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-telluriumarsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infra-red light.

Numerous inactive resin materials may be employed in the photogenerating binder layer including those described, for example, in U.S. Pat. No. 3,121,006, the entire disclosure of which is incorporated herein by reference. Typical organic resinous binders include thermoplastic and thermosetting resins such as polycarbonates, polyesters, polyamides, polyurethanes, polystyrenes, polyarylethers, polyarylsulfones, polybutadiene, polysulfones, polyethersulfones, polyethylenes, polypropylenes, polyimides, polymethylpentenes, polyphenylene sulfides, polyvinyl acetate, polysiloxanes, polyacrylates; polyvinyl acetals, polyamides, polyimides, amino resins, phenylene oxide resins, terephthalic acid resins, epoxy resins, phenolic resins, polystyrene and acrylonitrile terpolymers; polyvinylchloride, vinylchloride arnd vinyl acetate terpolymers, acrylate terpolymers, alkyd resins, cellulosic film formers, poly(amideimide), styrene-butadiene terpolymers, vinylidenechloride-vinylchloride terpolymers, vinylacetate-vinylidenechloricle terpolymers, styrene-alkyd resins, and the like. These polymers may be block, random or alternating terpolymers.

Active carrier transporting resin may also be employed as the binder in the photogenerating layer. These resins are particularly useful where the concentration of carrier generating pigment particles is low and the thickness of the carrier generation layer is substantially thicker than about 0.7 micrometer. The active resin commonly used as a binder is polyvinylcarbazole whose function is to transport carriers which would otherwise be trapped in the layer.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

For embodiments in which the photogenerating layers do not contain a resinous binder, the photogenerating layer may comprise any suitable, well known homogeneous photogenerating material. Typical homogeneous photogenerating materials include inorganic photoconductive compounds such as amorphous selenium, selenium alloys selected such as selenium-tellurium, selenium-tellurium-arsenic, and selenium arsenide and organic materials such as Vanadyl phthalocyanine, chlorindium, phthalocyanine.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

Any suitable charge transport layer may be utilized on the charge generator layer, if the charge transport layer is overcoated. The active charge transport layer may comprise any suitable transparent organic polymer of non-polymeric material capable of supporting the injection of photogenerated holes and electrons from the charge generating layer and allowing the transport of these holes or electrons through the organic layer to selectively discharge the surface charge. The charge transport layer in conjunction. with the generation layer is a material which is an insulator to the extent that an electrostatic charge placed on the transport layer is not conducted in the absence of illumination. Thus, the active charge transport layer is a substantially non-photoconductive material which supports the injection of photogenerated holes from the generation layer.

An especially preferred transport layer employed in one of the two electrically operative layers in a multilayer photoconductor embodiment of this invention comprise from about 25 to about 75 percent by weight of at least one charge transporting aromatic amine compound, and about 75 to about 25 percent by weight of a polymeric film forming resin in which the aromatic amine is soluble. A dried charge transport layer containing between about 40percent and about 50 percent by weight of the small molecule charges transport molecule based on the total weight of the dried charge transport layer is preferred.

The charge transport layer coating composition, if overcoated, preferably comprises an aromatic amine compound. Typical aromatic amine compounds include triphenyl amines, bis and poly triarylamines, bis arylamine ethers, bis alkyl-arylamines and the like.

Examples of charge transporting aromatic amines for charge transport layers capable of supporting the injection of photogenerated holes of a charge generating layer and transporting the holes through the charge transport layer include, for example, triphenylmethane, bis(4-diethylamine-2-methylphenyl)phenylmethane; 4'-4"-bis(diethylamino)-2', 2"-dimethyltriphenylmethane, N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis (chlorophenyl)-[1,1'-biphenyl]-4,4'-diamine, N,N'-diphenyl-N,N'-bis(3"methylphenyl)-(1,1'-biphenyl)-4,4'-diamine, and the like dispersed in an inactive resin binder.

Any suitable inactive resin binder soluble in methylene chloride or other suitable solvent may be employed in the process of this invention. Typical inactive resin binders soluble in methylene chloride include polycarbonate resin, polyester, polyarylate, polyacrylate, polyether, polysulfone, and the like. Molecular weights can vary, for example, from about 20,000 to about 1,500,000.

The preferred electrically inactive resin materials are polycarbonate resins have a molecular weight from about 20,000 to about 120,000, more preferably from about 50,000 to about 100,000. The materials most preferred as the electrically inactive resin material is poly(4,4'-dipropylidene-diphenylene carbonate) with a weight average molecular weight of from about 35,000 to about 40,000, available as LEXAN™ 145 from General Electric Company; poly(4,4'-isopropylidene-diphenylene carbonate) with a weight average molecular weight of from about 40,000 to about 45,000, available as LEXAN™ 141 from the General Electric Company; a polycarbonate resin having a weight average molecular weight of from about 50,000 to about 100,000, available as MAKROLON™ from Farbenfabricker Bayer. A. G., a polycarbonate resini having a weight average molecular weight of from bout 20,000 to about 50,000 available MERLON™ from Mobay Chemical Company and poly(4,4'-diphenyl-1,1'-cyclohexanet carbonate) with, a weight average molecular weight of from about 35,000 to about 40,000, available as PCZ, 400available from Mitsubishi Chemical Co. Excellent results are achieved when the charge transport layer comprises N,N'-diphenyl-N,N'-bis(3-methylphenyl)-[1,1'-biphenyl]-4,4'-diamine in poly(4,4'-diphenyl-1,1'-cyclohexane carbonate) binder.

Examples of photosensitive members having at least two electrically operative layers include the charge generator layer and diamine containing transport layer members disclosed in U.S. Pat. No. 4,265,990, U.S. Pat. No. 4,233,384, U.S. Pat. No. 4,306,008 and U.S. Pat. No. 4,439,507, the disclosures of these patents being incorporated herein in their entirety.

Any suitable and conventional technique may be utilized to mix and thereafter apply, the charge transport layer coating mixture to the charge generating layer. Typical application techniques include spraying, dip coating, roll coating, wire wound rod coating, and the like. Drying of the deposited coating may be effected by any suitable conventional technique such as oven drying, infra red radiation drying, air drying and the like. Generally, the thickness of the transport layer is, between about 5 micrometers to about 100 micrometers, but thicknesses outside this range can also be used. A dried thickness of between about 18 micrometers and about 35 micrometers is preferred with optimum results being achieved with a thickness between about 20 micrometers and about 29 micrometers. Preferably, the charge transport layer comprises an arylamine small molecule dissolved or molecularly dispersed in a polycarbonate.

If the photoreceptor does not have an overcoat layer, the terpolymer of this invention is utilized as the charge transport layer. It the photoreceptor does not have an overcoat layer nor a charge transport layer, the terpolymer of this invention is present in the single electrophotoconductive layer. Although the terpolymer of this invention is always present in the outermost layer of the photoreceptor, it can, if desired also be used in other underlying layers such as the charge generating layer or charge transport layer. For example, when employed in an overcoating layer, it may also be used in the charge generating layer in liquid xerography. Preferably, the terpolymer of this invention is the only film forming material in the charge transport layer or overcoating. The coating containing the terpolymer of this invention may be applied by any suitable technique Preferably, the terpolymer of this invention applied as a coating in a solution of the terpolymer in any suitable solvent. Typical solvents include, for example, methylene chloride, tetrahydrofuran, chlorobenzene, toluene, and the like. The relative amount of terpolymer in the coating solution depends upon the coating technique utilized. Typical ranges of solids to solvent include, for example, 5 percent by weight to about 25 percent by weight of the terpolymer, based on the total weight of the solution. If the terpolymer of this invention is utilized in a charge transport layer of a photoreceptor free of an overcoating layer, the techniques and thicknesses used to form the charge transport layer are identical to the techniques for forming a conventional charge transport layer as described above.

If the terpolymer of this invention is employed in an overcoat layer, the thickness of the overcoat layer depends upon the abrasiveness of the cleaning system employed and can range from about 0.5 micrometer to about 10 micrometers in thickness. Generally, when an overcoat layer containing the terpolymer of this invention is used, the charge transport layer is preferably free of the terpolymer of this invention. However, depending upon the film forming polymer used in the charge transport layer and solvent employed to form the overcoat layer coating, some terpolymer material from the overcoat layer might migrate toward the surface of the charge transport layer surface and form an interface layer containing a mixture of the film forming polymer used in the charge transport layer and the terpolymer used in the overcoat layer. If desired, the presence of this interface layer may be determined using a cross section of the photoreceptor and microscopy techniques. Any suitable and conventional technique may be utilized to mix and thereafter apply the overcoat layer coating mixture to the charge generating layer. Typical application techniques include spraying, dip coating, roll coating, wire wound rod coating, and the like. Drying of the deposited coating may be effected by any suitable conventional technique such as oven drying, infrared radiation drying, air drying and the like.

Optionally, a back coating may be applied to the side opposite the photoreceptor to provide flatness and/or abrasion resistance. This backcoating layer may comprise organic polymers or inorganic polymers that are electrically insulating or slightly semi-conductive.

Other layers such as conventional ground strips comprising, for eample, conductive particles dispersed in a film forming binder may be applied to one edge of the photoreceptor in contact with the conductive surface, blocking layer, adhesive layer or charge generating layer.

The elecrophotographic member of the present invention may be employed in any suitable and conventional electrophotographic imaging process which utilizes charging prior to imagewise exposure to activating electromagnetic radiation. Conventional positive or reversal development techniques may be employed to form a marking material irmage on the imaging surface ofthe electrophotographic imaging memberof this invention. Thus, by applying a suitable electrical bias and selecting toner having the appropriate polarity of electrical charge, one may form a toner image in the negatively charged areas or discharged areas on the imaging surface of the electrophotographic member of the present invention. More specifically, for positive development, charged toner (marking) particles of one polarity are attracted to the oppositely charged electrostatic areas of the imaging surface and for reversal development, charged toner (marking) particles are attracted to the discharged areas of the imaging surface. Where the transport layer is sandwiched between a photogenerating layer and a conductive surface, a positive polarity charge is normally applied prior to imagewise exposure to activating electromagnetic radiation. Were the photogenerating layer is sandwiched between a transport layer and a conductive surface, a negative polarity charge is normally applied prior to imagewise exposure to activating electromagnetic radiation.

The electrophotographic member of the present invention suppresses corona induced deletion, resists adverse effects from contact with liquid ink developers, possesses excellent abrasion resistance, and is extremely flexible.

PREFERRED EMBODIMENT OF THE INVENTION

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

A dihydroxy triarylmethane was synthesized by charging in a 100 ml round bottom flask, equipped with a heating mantle, mechanical stirrer, reflux condenser and an argon blanket, with 12 grams (0.04 mole) N,N-di-p-tolylphenylamine-4-carboxaldehyde, 12.7 grams (0.104 mole) 2,5-dimethylphenol, and 20 mls of n-butanol into which 0.4 grams, $H_2SO_4$ was added. The mixture was heated to reflux and the reaction mixture turned green. After 45 minutes of reaction a precipitate started forming. The reaction was continued for 6 hours. The reaction was allowed to cool to near room temperature and neutralized with a dilute aqueous NaOH solution. A greenish—yellow solid was collected by filtration. The solids were washed with ethanol. The solids were taken up in a minimum amount of hot toluene, filtered and allowed to cool. A white crystalline material was obtained with a melting point of 248° C. and in 60 percent yield.

EXAMPLE II

An additional dihydroxy triarylmethane was prepared by reacting, in a 500 ml 3 neck round bottom flask equipped with a mechanical stirrer, reflux condenser, an argon blanket and a temperature controlled oil bath, the following: 125 grams N-beta-hydroxyethyl-N-ethyl-m-toluidine (freshly distilled), 29.7 grams benzaldehyde and 117 mls n-butanol containing 2.8 grams concentrated $H_2SO_4$ and 6 drops methane sulfonic acid. With rapid stirring the oil bath temperature was raised to 120° C. The reaction was maintained at this temperature for 18 hours. Aqueous KOH (40 percent solution) was slowly added to the slightly cooled reaction, until the acid was neutralized. This mixture was placed in a separation funnel along with 150 mls $H_2O$ and 150 mls $CH_2Cl_2$. The layers were slow to separate. Several water extractions carried out. The final methylene chloride solution was dried with anhydrous magnesium sulfate, filtered and then concentrated under vacuum. The residue went through a green colored phase during the vacuum concentration step until it reached a final amber color. The product is an amber glass that slowly crystallized upon standing. A 65 percent yield was obtained.

EXAMPLE III

A terpolymer of this invention was synthesized by charging, in a 1 liter 3 neck Morton flask, equipped with a mechanical stirrer, argon blanket, pressure equalized addition funnel, and a cooling bath, with 150 mls $H_2O$, 14 grams KOH flake, 1.25 gram benzyltriethylammonium chloride, 6.7 grams (0.0126 mole) of the bis-hydroxy triarylamine synthesized in Example I, 9.8 grams (0.0189 mole) N,N'-diphenyl-N,N'-bis(3-hydroxyphenyl)-(1,1'-biphenyl)-4,4'-diamine and 40 mls tetrahydrofuran. This mixture was stirred and cooled with an ice bath. After stirring for 0.5 hour, a clear solution was obtained. A solution of diethyleneglycol-bis-chloroformate (5.52 mls) in dichloromethane (150 mls) was prepared and placed in the pressure equalized addition funnel. This solution was added to the rapidly stirred (700 rpm) reaction mixture over a period on one hour. At the end of the addition the ice bath was replaced with a warm water bath. The bath was maintained until the reaction was at room temperature. The reaction was continued for 1.5 hours, at which point the mixture was placed in a separation funnel with an additional 100 mls of dichloromethane. The reaction mixture was extracted 3 times with dilute HCl (aq). The dichloromethane solution was added to methanol in a blender causing the polymer to precipitate from solution. The polymer was collected by filtration and was dried under vacuum. 20 grams of product was obtained.

EXAMPLE IV

A charge generating device was prepared by forming coatings using conventional techniques on a substrate comprising a vacuum deposited titanium layer on a polyethylene terephthalate film. The first coating is a siloxane barrier layer formed from hydrolyzed gamma aminopropyltriethoxysilane having a thickness of 0.005 micrometer (50 Angstroms). The barrier layer coating composition is prepared by mixing 3-aminopropyltriethoxysilane (available from PCR Research Chemicals of Florida) with ethanol in a 1:50 volume ratio. The coating composition is applied by a multiple clearance film applicator to form a coating having a wet thickness of 0.5 mil. The coating is then allowed to dry for 5 minutes at room temperature, followed by curing for 10 minutes a 110 degrees centigrade in a forced air oven. The second coating is an adhesive layer of polyester resin (49,000 available from E. I. DuPont de Nemours & Co.) having a thickness of 0.005 micron (50 Angstroms). The second coating composition is prepared by dissolving 0.5 gram of 49,000 polyester resin in 70 grams of tetrahydrofuran and 29.5 grams of cyclohexanone. The second composition is applied using a 0.5 mil bar and the resulting coating is cured in a forced air oven for 10 minutes. The next coating is a charge generator layer containing 35 percent by weight vanadyl phthalocyanine particles obtained by the process as disclosed in U.S. Pat. No. 4,771,133, dispersed in a polyester resin (VITEL™ PE 100, available from Goodyear Tire and Rubber Co.) having a thickness of 1 micrometer.

EXAMPLE V

A photoreceptor sample was fabricated starting with a generator device prepared as described in Example IV. To this device was applied a charge transport layer and is coated with a solution containing one gram of N,N'-diphenyl-N,N'-bis(3-methylphenyl)-(1,1-biphenyl)4,4'-diamine and one gram of polycarbonate resin (poly(4,4'-isopropylidene-diphenylene carbonate, available as MAKROLON® from Farbenfabricken Bayer A. G.), dissolved in 11.5 grams of methylene chloride solvent using a Bird coating applicator. The N,N'-diphenyl-N,N'-bis(3-methylphenyl)-(1,1-biphenyl)-4,4'-diamine is an electrically active aromatic diamine charge transport small molecule whereas the polycarbonate resin is an electrically inactive film forming binder. The coated device is dried at 80° C. for half an hour in a forced air oven.

EXAMPLE VI

An additional photoreceptor sample was fabricated starting with a generator device prepared as described in Example IV. To this device was applied a solution containing one gram of polyethercarbonate dissolved in 11.0 grams of methylene chloride solvent using a Bird coating applicator. The polyethercarbonate resin was prepared as described in Example III of U.S. Pat. No. 4,806,443. This polyethercarbonate resin is an electrically active charge transporting film forming polymer and can be represented by the formula:

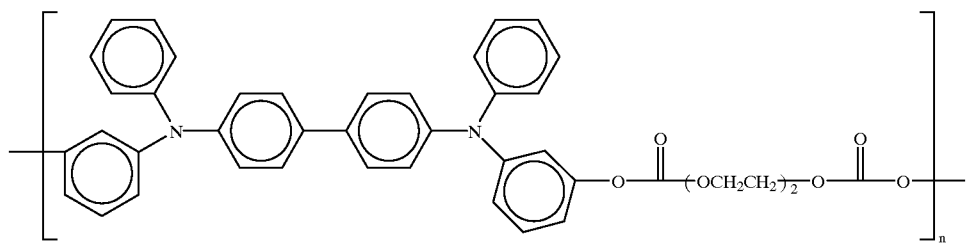

wherein n is about 300 in the above formula so the molecular weight of the polymer is about 200,000. The coated device was dried at 60° C. in a forced air oven for one hour.

EXAMPLE VII

An additional photoreceptor sample was fabricated starting with a generator device prepared as described in Example IV. To this device was applied a solution containing one gram of the resin of this invention as prepared in Example III dissolved in 10 grams of methylene chloride solvent using a Bird coating applicator. The coated device was dried at 60° C. in a forced air oven.

EXAMPLE VIII

A parking deletion test was conducted. In this test, a negative corotron was operated (with high voltage connected to the corotron wire) opposite a grounded electrode for several hours. The high voltage was then turned off, and the corotron was placed (or parked) for thirty minutes on a segment of the photoconductor device being tested. Only a short middle segment of the device was thus exposed to the corotron effluents. Unexposed regions on either side of the exposed regions were used as controls. The photoconductor device was then tested in a scanner for positive charging properties for systems employing donor type molecules. These Systems were operated with negative polarity corotron in the last image formation step. An electrically conductive surface region (excess hole concentration) appeared as a loss of positive charge acceptance or increased dark decay in the exposed regions (compared to the unexposed control areas on either side of the short middle segment). Since the electrically conductive region was located on the surface of the device, a negative charge acceptance scan was not affected by the corotron effluent exposure (negative charges do not move through a charge transport layer made up of donor molecules). However, the excess carriers on the surface cause surface conductivity resulting in loss of image resolution and, in severe cases, causes deletion.

A dramatic improvement was observed when the terpolymer of this invention, as used in the device prepared in Example VII, was compared to the photoreceptor samples prepared in Examples V and VI in this test. The photoreceptor devices of Examples V, VI and VII were tested for deletion resistance. The region not exposed to corona effluents charged to 800 positive in the three devices; however the corona exposed region of device of Example V charged to 500 volts (a loss of 300 volts of charge acceptance); the corona exposed region of device of Example VI charged to 300 volts (a loss of 500 volts of charge acceptance); whereas the corona exposed region of the device of Example VII, containing the terpolymer of this invention, charged to 700 volts (a loss of only 100 volts). The terpolymer has shown a dramatic increase in deletion resistance. The terpolymer of this invention, when coated on a generator layer as prepared in Example IV, had good sensitivity. Also the cyclic stability was good.

Although the invention has been described with reference to specific preferred embodiments, it is not intended to be limited thereto, rather those having ordinary skill in as the art will recognize that variations and modifications may be made therein which are within the spirit of the invention and within the scope of the claims.

What is claimed is:

1. A terpolymer represented by the formula

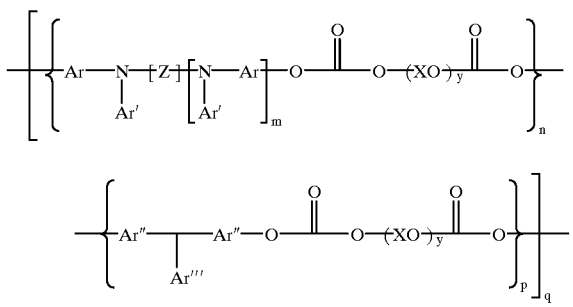

wherein n+p=1 and values of p range from 0.05 to 0.40, q is between about 5 and about 1000, m is 0 or 1, y is 1, 2 or 3, Z is selected from the group consisting of:

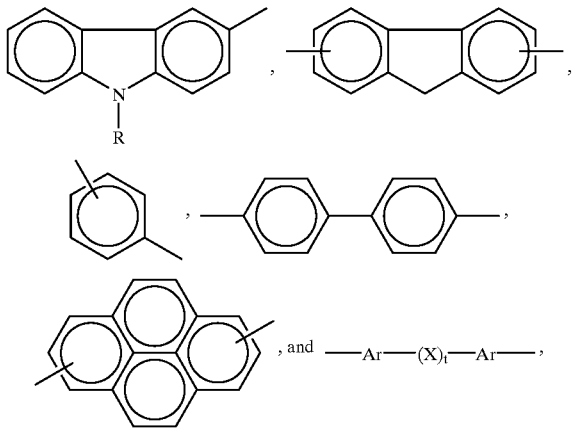

wherein t is 1, 2 or 3

Ar is selected from the group consisting of:

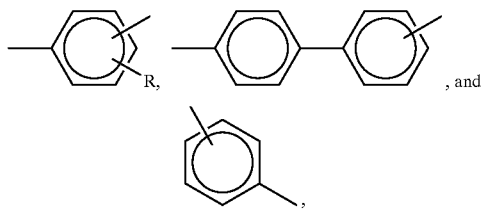

R is selected from the group consisting of alkyl and iso-alkyl groups containing 2 to 10 carbon atoms, Ar' is selected from the group consisting of:

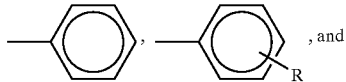

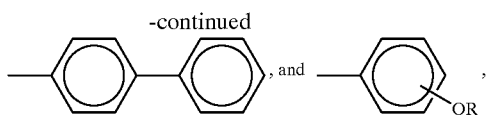

Ar" is selected from the group consisting of:

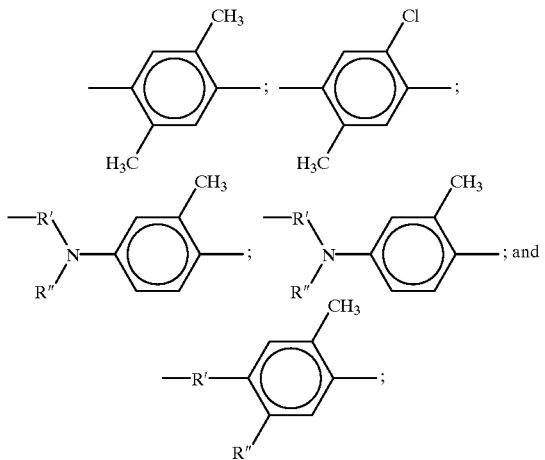

R' is selected from the group consisting of: —CH$_2$—; —CH$_2$CH$_2$; and —CH$_2$CH$_2$CH$_2$—, Ar'" is selected from the group consisting of:

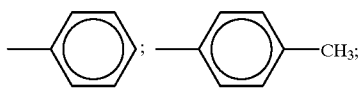

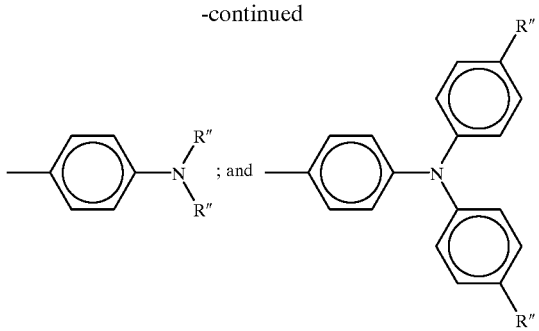

R" is selected from the group consisting of: —CH$_3$ and —C$_2$H$_5$,

X is selected from the group consisting of:

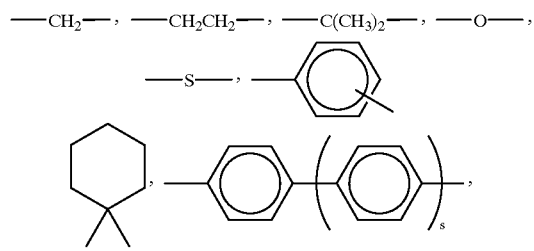

and >N—R, and s is 0, 1 or 2.

2. A terpolymer according to claim 1 wherein the terpolymer is represented by the formula

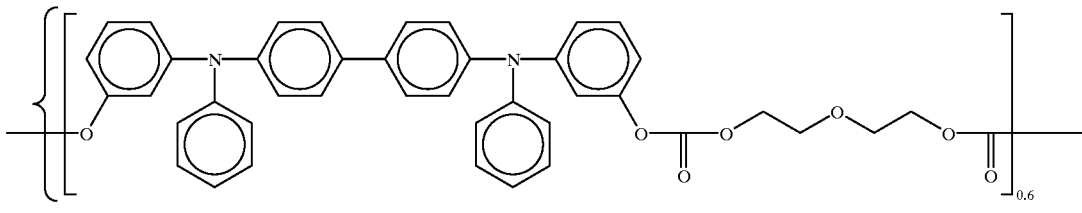

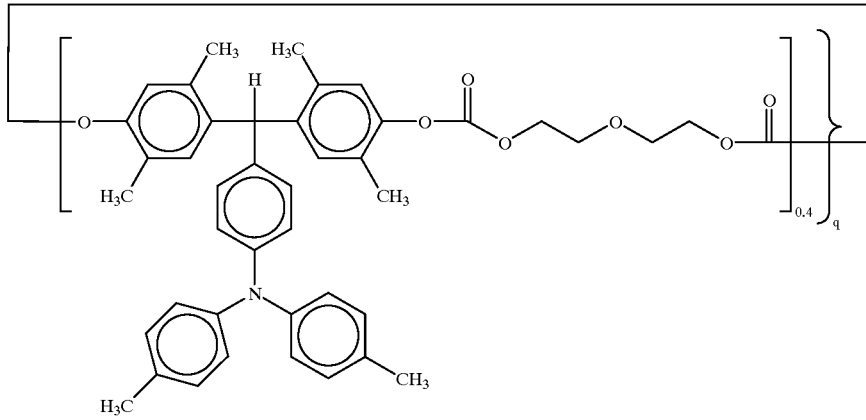

3. The terpolymer of claim 1, wherein R is an alkyl group containing 2 to 4 carbon atoms.

4. A terpolymer according to claim 1 wherein the terpolymer is a reaction product derived from a coreactant represented by the formula

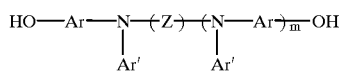

wherein m is 0 or 1,

Z is selected from the group consisting of:

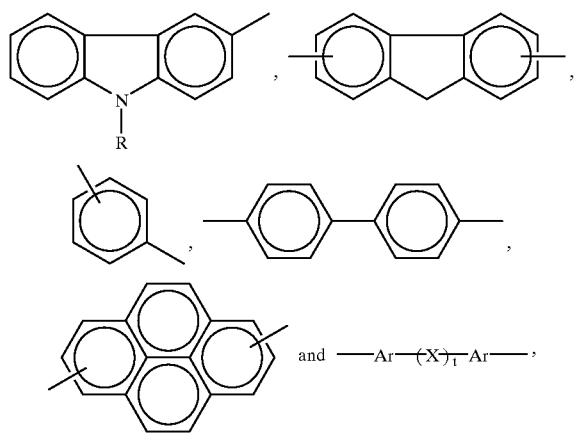

wherein t is 1, 2 or 3

Ar is selected from the group consisting of:

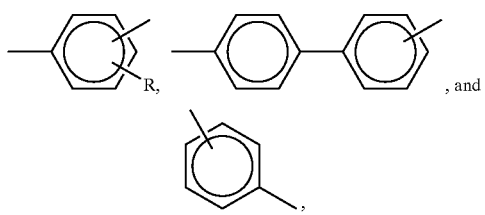

R is an alkyl containing 2 to 4 carbon atoms, and

Ar' is selected from the group consisting of:

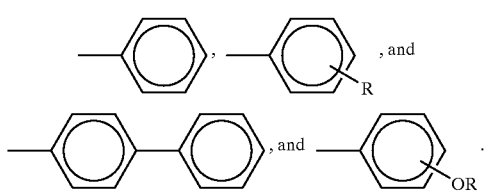

5. A terpolymer according to claim 1 wherein the terpolymer is a reaction product derived from a coreactant represented by the formula

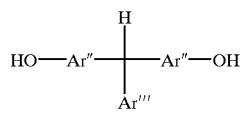

wherein

Ar" is selected from the group consisting of:

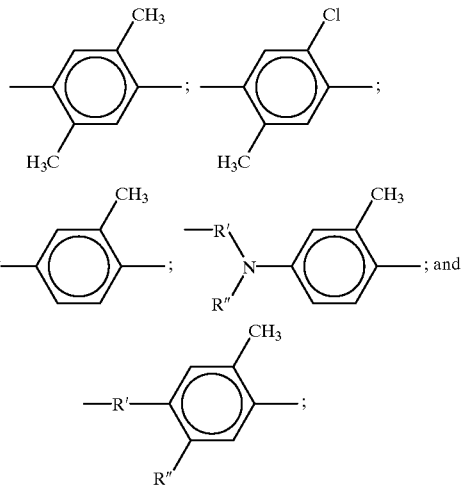

and Ar'" is selected from the group consisting of:

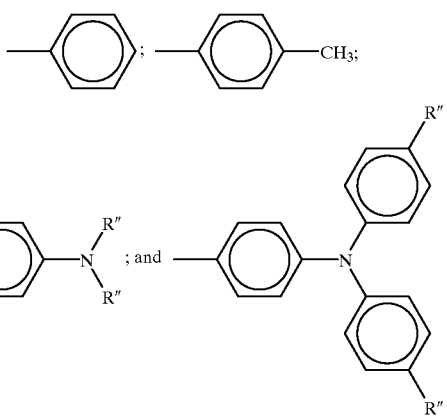

6. A terpolymer according to claim 1 wherein the terpolymer is a reaction product derived from a coreactant represented by the formula

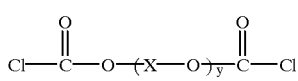

wherein y is 1, 2 or 3, and

X is selected from the group consisting of:

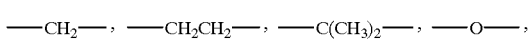

-continued

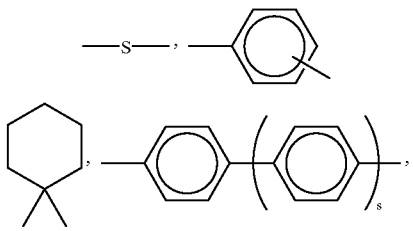

and >N—R,
and s is 0, 1 or 2.

7. An electrostatographic imaging member comprising an electrically conductive substrate, at least one electrophotographic imaging layer and an outmost layer, the outermost layer comprises a terpolymer represented by the formula

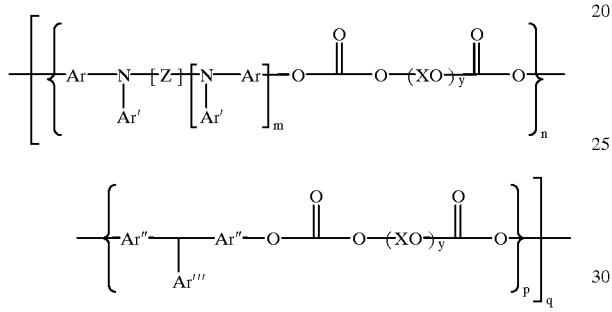

wherein n+p=1 and values of p range from 0.05 to 0.40,
q is between about 5 and about 1000,
m is 0 or 1,
y is 1, 2 or 3,
Z is selected from the group consisting of:

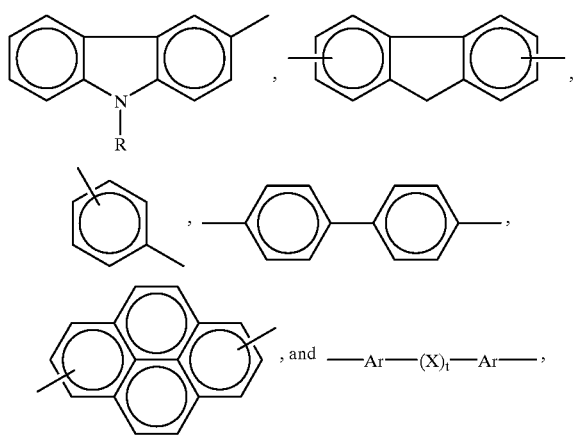

wherein t is 1, 2 or 3
Ar is selected from the group consisting of:

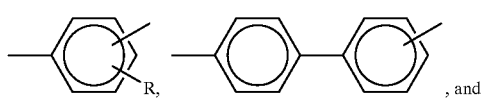

-continued

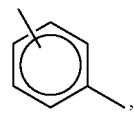

R is selected from the group consisting of alkyl and iso-alkyl groups containing 2 to 10 carbon atoms,
Ar' is selected from the group consisting of:

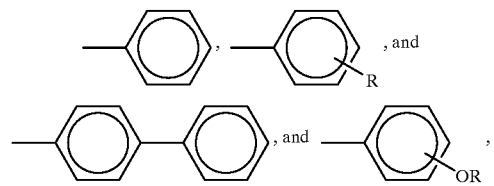

Ar" is selected from the group consisting of:

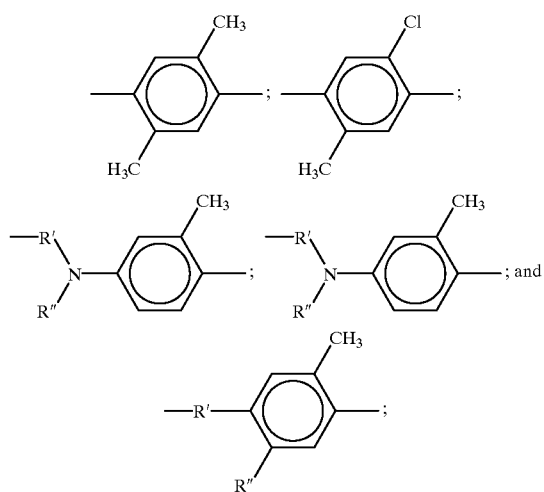

R' is selected from the group consisting of: —CH$_2$—; —CH$_2$CH$_2$—; and —CH$_2$CH$_2$CH$_2$—,
Ar''' is selected from the group consisting of:

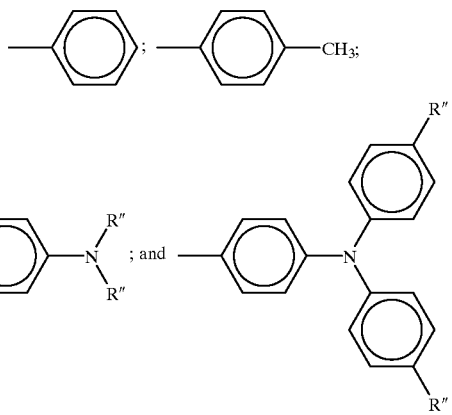

R" is selected from the group consisting of: —CH$_3$ and —C$_2$H$_5$,

X is selected from the group consisting of:

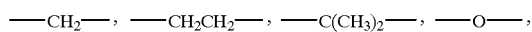

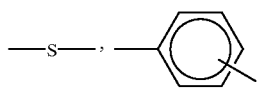

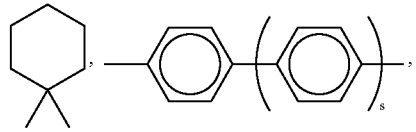

and >N—R, and s is 0, 1 or 2.

8. An electrostatographic imaging member according to claim 7 wherein the outermost layer is a charge transport layer.

9. An electrostatographic imaging member according to claim 7 wherein the outermost layer is an overcoating layer.

10. An electrostatographic imaging member according to claim 9 wherein the overcoating layer has a thickness between about 0.5 micrometer and about 10 micrometers.

11. An electrostatographic imaging process comprising providing an electrostatographic imaging member having an electrically conductive substrate and an outer layer having an imaging surface, the outer layer comprising a terpolymer represented by the formula

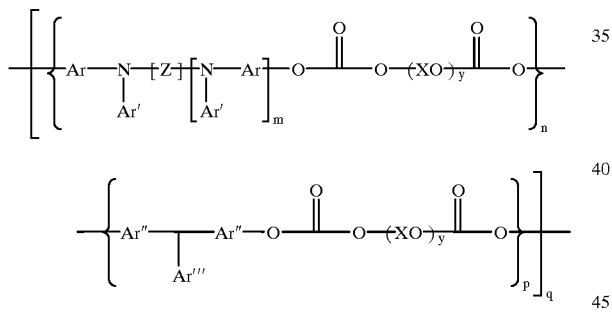

wherein n+p=1 and values of p range from 0.05 to 0.40, q is between about 5 and about 1000, m is 0 or 1, y is 1, 2 or 3, Z is selected from the group consisting of:

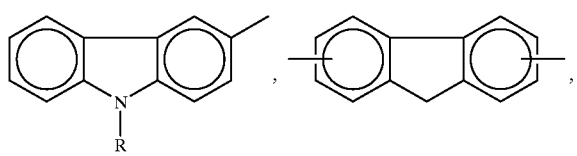

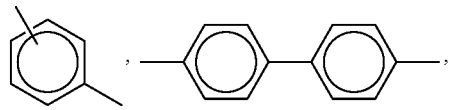

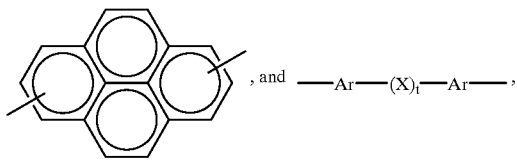

wherein t is 1, 2 or 3

Ar is selected from the group consisting of:

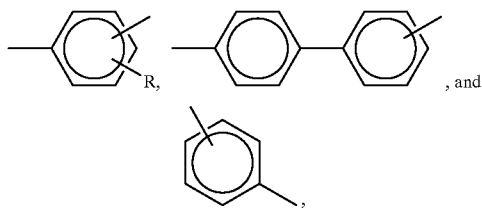

R is selected from the group consisting of alkyl and iso-alkyl groups containing 2 to 10 carbon atoms, Ar' is selected from the group consisting of:

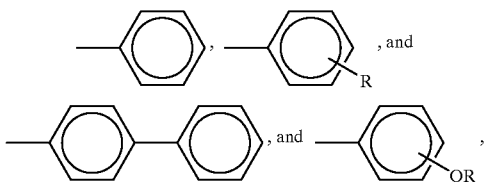

Ar" is selected from the group consisting of:

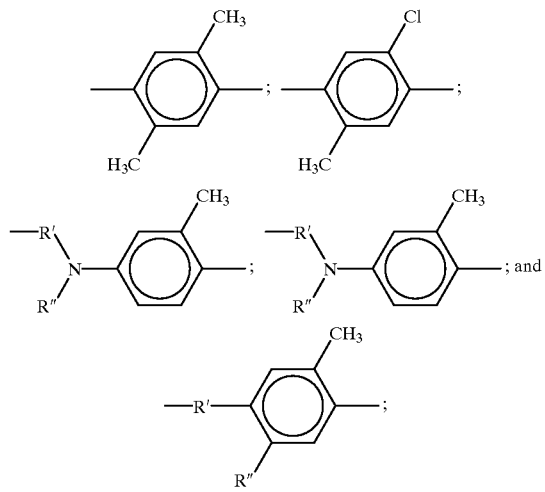

R' is selected from the group consisting of —$CH_2$—; —$CH_2CH_2$—; and —$CH_2CH_2CH_2$—, Ar''' is selected from the group consisting of:

—⬡—; —⬡—$CH_3$;

-continued

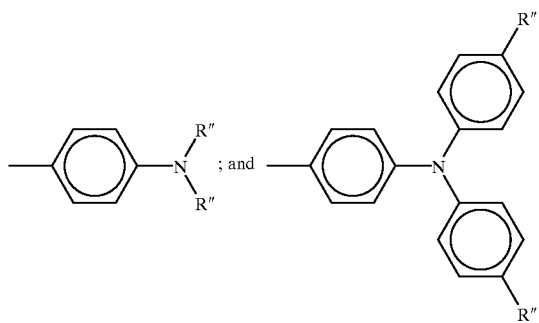

R" is selected from the group consisting of: —CH$_3$ and —C$_2$H$_5$,

X is selected from the group consisting of:

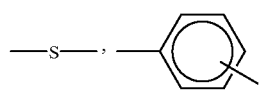

-continued

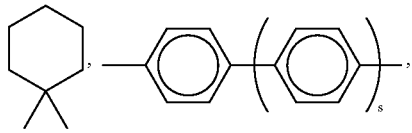

and >N—R, and s is 0, 1 or 2 forming an electrostatic latent image on the imaging surface and contacting the imaging surface with a developer comprising electrostatically attractable marking particles whereby the electrostatically attractable marking particles deposit on the imaging surface in conformance with the electrostatic latent image to form a marking particle image.

12. An electrostatographic imaging process according to claim 11 wherein the imaging member comprises a charge generating layer and a charge transport layer.

13. An eiectrostatographic imaging process according to claim 12 wherein the, outer layer is a charge transport layer.

14. An electrostatographic imaging process according to claim 11 wherein the outer layer is an overcoating layer.

* * * * *